United States Patent
Chang et al.

(10) Patent No.: US 9,626,411 B1
(45) Date of Patent: Apr. 18, 2017

(54) SELF-DESCRIBED QUERY EXECUTION IN A MASSIVELY PARALLEL SQL EXECUTION ENGINE

(71) Applicant: EMC Corporation, Hopkinton, MA (US)

(72) Inventors: Lei Chang, Beijing (CN); Zhanwei Wang, Beijing (CN); Tao Ma, Beijing (CN); Luke Lonergan, San Carlos, CA (US); Lirong Jian, Beijing (CN); Lili Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 13/853,060

(22) Filed: Mar. 29, 2013

Related U.S. Application Data (60) Provisional application No. 61/769,043, filed on Feb. 25, 2013.

(51) Int. Cl.
*G06F 7/02* (2006.01)
*G06F 17/30* (2006.01)

(52) U.S. Cl.
CPC .. *G06F 17/30463* (2013.01); *G06F 17/30445* (2013.01); *G06F 17/30545* (2013.01)

(58) Field of Classification Search
CPC ......... G06F 17/30545; G06F 17/30463; G06F 17/30445; G06F 17/30
See application file for complete search history.

(56) References Cited

U.S. PATENT DOCUMENTS

| | | |
|---|---|---|
| 5,857,180 A | 1/1999 | Hallmark et al. |
| 6,219,692 B1 | 4/2001 | Stiles |
| 6,678,695 B1 | 1/2004 | Bonneau et al. |
| 6,928,451 B2 | 8/2005 | Mogi et al. |
| 7,051,034 B1 | 5/2006 | Ghosh et al. |
| 7,072,934 B2 | 7/2006 | Helgeson et al. |
| 7,447,786 B2 | 11/2008 | Loaiza et al. |
| 7,849,073 B2 | 12/2010 | Young-Lai |
| 7,873,650 B1 | 1/2011 | Chapman et al. |
| 7,877,379 B2 | 1/2011 | Waingold et al. |
| 7,984,043 B1 | 7/2011 | Waas |
| 8,051,052 B2 | 11/2011 | Jogand-Coulomb et al. |
| 8,060,522 B2 | 11/2011 | Birdwell et al. |
| 8,171,018 B2 | 5/2012 | Zane et al. |
| 8,195,705 B2 | 6/2012 | Calvignac et al. |

(Continued)

OTHER PUBLICATIONS

"Parallel Processing & Parallel Database", 1997, Oracle.

(Continued)

*Primary Examiner* — Bruce Moser
(74) *Attorney, Agent, or Firm* — Van Pelt, Yi & James LLP (57) ABSTRACT

A query is executed in a massively parallel processing data storage system comprising a master node communicating with a cluster of multiple segments that access data in distributed storage by producing a self-described query plan at the master node that incorporates changeable metadata and information needed to execute the self-described query plan on the segments, and that incorporates references to obtain static metadata and information for functions and operators of the query plan from metadata stores on the segments. The distributed storage may be the Hadoop distributed file system, and the query plan may be a full function SQL query plan.

24 Claims, 4 Drawing Sheets

(56) References Cited

U.S. PATENT DOCUMENTS

| | | | |
|---|---|---|---|
| 8,209,697 B2 | 6/2012 | Kobayashi et al. | |
| 8,239,417 B2 | 8/2012 | Gu et al. | |
| 8,370,394 B2 | 2/2013 | Atta et al. | |
| 8,640,137 B1 | 1/2014 | Bostic et al. | |
| 8,788,464 B1 | 7/2014 | Lola et al. | |
| 8,832,078 B2 | 9/2014 | Annapragada et al. | |
| 8,886,631 B2 | 11/2014 | Abadi et al. | |
| 8,935,232 B2 | 1/2015 | Abadi et al. | |
| 9,002,813 B2 | 4/2015 | Gruschko et al. | |
| 9,002,824 B1 * | 4/2015 | Sherry | G06F 17/30371 707/718 |
| 9,177,008 B1 | 11/2015 | Sherry et al. | |
| 9,229,979 B2 * | 1/2016 | Shankar | G06F 17/30445 |
| 2003/0145047 A1 | 7/2003 | Upton | |
| 2003/0204427 A1 | 10/2003 | Gune et al. | |
| 2003/0208458 A1 | 11/2003 | Dettinger et al. | |
| 2003/0229627 A1 | 12/2003 | Carlson et al. | |
| 2003/0229639 A1 | 12/2003 | Carlson et al. | |
| 2003/0229640 A1 | 12/2003 | Carlson et al. | |
| 2004/0039729 A1 | 2/2004 | Boger et al. | |
| 2004/0103087 A1 | 5/2004 | Mukherjee et al. | |
| 2004/0128290 A1 | 7/2004 | Haas et al. | |
| 2004/0177319 A1 | 9/2004 | Horn | |
| 2004/0215626 A1 | 10/2004 | Colossi et al. | |
| 2005/0193035 A1 | 9/2005 | Byrne | |
| 2005/0209988 A1 | 9/2005 | Cunningham et al. | |
| 2005/0278290 A1 | 12/2005 | Bruce et al. | |
| 2006/0149799 A1 | 7/2006 | Wong et al. | |
| 2007/0203893 A1 | 8/2007 | Krinsky et al. | |
| 2008/0016080 A1 | 1/2008 | Korn et al. | |
| 2009/0019007 A1 * | 1/2009 | Niina | G06F 17/30545 |
| 2009/0254916 A1 | 10/2009 | Bose et al. | |
| 2009/0327242 A1 | 12/2009 | Brown et al. | |
| 2010/0094716 A1 | 4/2010 | Ganesan et al. | |
| 2010/0198855 A1 | 8/2010 | Ranganathan et al. | |
| 2011/0041006 A1 | 2/2011 | Fowler | |
| 2011/0060732 A1 | 3/2011 | Bonneau et al. | |
| 2011/0228668 A1 | 9/2011 | Pillai et al. | |
| 2011/0302151 A1 | 12/2011 | Abadi et al. | |
| 2011/0302226 A1 | 12/2011 | Abadi et al. | |
| 2011/0302583 A1 | 12/2011 | Abadi et al. | |
| 2012/0030220 A1 | 2/2012 | Edwards et al. | |
| 2012/0117120 A1 | 5/2012 | Jacobson et al. | |
| 2012/0166417 A1 | 6/2012 | Chandramouli et al. | |
| 2012/0191699 A1 | 7/2012 | George et al. | |
| 2012/0203765 A1 | 8/2012 | Ackerman et al. | |
| 2012/0303669 A1 | 11/2012 | Chmiel et al. | |
| 2012/0310916 A1 | 12/2012 | Abadi et al. | |
| 2013/0041872 A1 | 2/2013 | Aizman et al. | |
| 2013/0086039 A1 | 4/2013 | Salch et al. | |
| 2013/0144878 A1 | 6/2013 | James et al. | |
| 2013/0166588 A1 | 6/2013 | Gruschko et al. | |
| 2013/0179474 A1 | 7/2013 | Charlet et al. | |
| 2013/0282650 A1 | 10/2013 | Zhang et al. | |
| 2013/0332478 A1 | 12/2013 | Bornea et al. | |
| 2014/0032528 A1 * | 1/2014 | Mandre | G06F 17/30463 707/718 |
| 2014/0067792 A1 | 3/2014 | Erdogan et al. | |
| 2014/0108861 A1 * | 4/2014 | Abadi et al. | 714/11 |
| 2014/0114952 A1 | 4/2014 | Robinson et al. | |
| 2014/0114994 A1 | 4/2014 | Lindblad et al. | |
| 2014/0156636 A1 | 6/2014 | Bellamkonda et al. | |
| 2014/0188825 A1 | 7/2014 | Muthukkaruppan et al. | |

OTHER PUBLICATIONS

"Greenplum Database: Critical Mass Innovation", 2010.
"Greenplum Database 4.1 Administrator Guide", 2011 (1 of 3).
"Greenplum Database 4.1 Administrator Guide", 2011 (2 of 3).
"Greenplum Database 4.1 Administrator Guide", 2011 (3 of 3).
Borthakur et al., "Apache Hadoop Goes Realtime at Facebook", 2011, ACM.
Zaharia et al., "Resilient Distributed Datasets: A Fault-Tolerant Abstraction for In-Memory Cluster Computing", 2011, Princeton, cs.princeton.edu.
Zhao et al., "Research of P2P Architecture based on Cloud Computing", 2010, IEEE.
B. Hedlund, "Understanding Hadoop Clusters and the Network", 2011, bradhedlund.com/2011/09/10/understanding-hadoop-clusters and the network.
Shafer et al., "The Hadoop Distributed Filesystem: Balancing Portability and Performance", 2010, IEEE.
Wang et al. "Hadoop High Availability through Metadata Replication", 2009, ACM.
Nguyen et al., "A MapReduce Workflow System for Architecting Scientific Data Intensive Applications", 2011, ACM.
C. Zhang, "Enhancing Data Processing on Clouds with Hadoop/HBase", 2011, University of Waterloo, Waterloo, Ontario, Canada, 2011. www.uwspace.uwaterloo.ca/handle/10012/6361.
K. Elmeleegy, "Piranha: Optimizing Short Jobs in Hadoop", Aug. 30, 2013, Proceedings of the VLDB Endowment.
Hsu et al., "A Cloud Computing Implementation of XML Indexing Method Using Hadoop", 2012, Springer-Verlag.
Shvachko et al., "The Hadoop Distributed File System" 2010, IEEE.

* cited by examiner

SELF-DESCRIBED QUERY EXECUTION IN A MASSIVELY PARALLEL SQL EXECUTION ENGINE

CROSS-REFERENCE TO RELATED APPLICATIONS

This application claims the benefit of U.S. Provisional Application No. 61/769,043, filed Feb. 25, 2013, the disclosure of which is incorporated by reference herein.

BACKGROUND

This invention relates generally to massively parallel processing (MPP) data storage systems and methods for big data applications, and more particularly to new and improved MPP system architectures comprising large clusters of commodity servers, and associated query execution models for accessing data in such systems.

Most successful companies use data to their advantage. The data are no longer easily quantifiable facts, such as point of sale transaction data. Rather, companies retain, explore, analyze, and manipulate all the available information in their purview. Ultimately, they may analyze the data to search for evidence of facts, and insights that lead to new business opportunities or which leverage their existing strengths. This is the business value behind what is often referred to as "Big Data".

Big data is "big" because it comprises massive quantities, frequently hundreds of terabytes or more, of both structured and unstructured data. Among the problems associated with such big data is the difficulty of quickly and efficiently analyzing the data to obtain relevant information. Conventional relational databases store structured data and have the advantage of being compatible with the structured query language (SQL), a widely used powerful and expressive data analysis language. Increasingly, however, much of big data is unstructured or multi-structured data for which conventional relational database architectures are unsuited, and for which SQL is unavailable. This has prompted interest in other types of data processing platforms.

The Apache Software Foundation's open source Hadoop distributed file system (HDFS) has rapidly emerged as one of the preferred solution for big data analytics applications that grapple with vast repositories of unstructured or multi-structured data. It is flexible, scalable, inexpensive, fault-tolerant, and is well suited for textual pattern matching and batch processing, which has prompted its rapid rate of adoption by big data. HDFS is a simple but extremely powerful distributed file system that can be implemented on a large cluster of commodity servers with thousands of nodes storing hundreds of petabytes of data, which makes it attractive for storing big data. However, Hadoop is a non-SQL compliant, and, as such, does not have available to it the richness of expression and analytic capabilities of SQL systems. SQL based platforms are better suited to near real-time numerical analysis and interactive data processing, whereas HDFS is better suited to batch processing of large unstructured or multi-structured data sets.

A problem with such distinctly different data processing platforms is how to combine the advantages of the two platforms by making data resident in one data store available to the platform with the best processing model. The attractiveness of Hadoop in being able to handle large volumes of multi-structured data on commodity servers has led to its integration with MapReduce, a parallel programming framework that integrates with HDFS and allows users to express data analysis algorithms in terms of a limited number of functions and operators, and the development of SQL-like query engines, e.g., Hive, which compile a limited SQL dialect to interface with MapReduce. While this addresses some of the expressiveness shortcomings by affording some query functionality, it is slow and lacks the richness and analytical power of true SQL systems.

One reason for the slowness of HDFS with MapReduce is the necessity for access to metadata information needed for executing queries. In a distributed file system architecture such as HDFS the data is distributed evenly across the multiple nodes. If the metadata required for queries is also distributed among many individual metadata stores on the multiple distributed nodes, it is quite difficult and time-consuming to maintain consistency in the metadata. An alternative approach is to use a single central metadata store that can be centrally maintained. Although a single metadata store can be used to address the metadata consistency problem, it has been impractical in MPP database systems. A single central metadata store is subject to large numbers of concurrent accesses from multiple nodes running parallel queries, such as is the case with HDFS, and this approach does not scale well. The system slows rapidly as the number of concurrent accesses to the central store increases. Thus, while HDFS has many advantages for big data applications, it also has serious performance disadvantages. A similar problem exists in using a central metadata store in conventional MPP relational databases that requires large numbers of concurrent access. What is needed is a different execution model and approach for executing queries in such distributed big data stores.

It is desirable to provide systems and methods that afford execution models and approaches for massively parallel query processing in distributed file systems that address the foregoing and other problems of MPP distributed data storage systems and methods, and it is to these ends that the present invention is directed.

DESCRIPTION OF PREFERRED EMBODIMENTS

This invention is particularly well adapted for use with a new MPP database system of the assignee of this invention comprising the native integration of a Hadoop HDFS and a massively parallel SQL distributed database with a massively parallel SQL query engine that affords true (full) SQL processing for Hadoop, and will be described in that context. It will be appreciated, however, that this is illustrative of only one utility of the invention and that the invention has applicability to other types of systems and methods.

Figure 1:
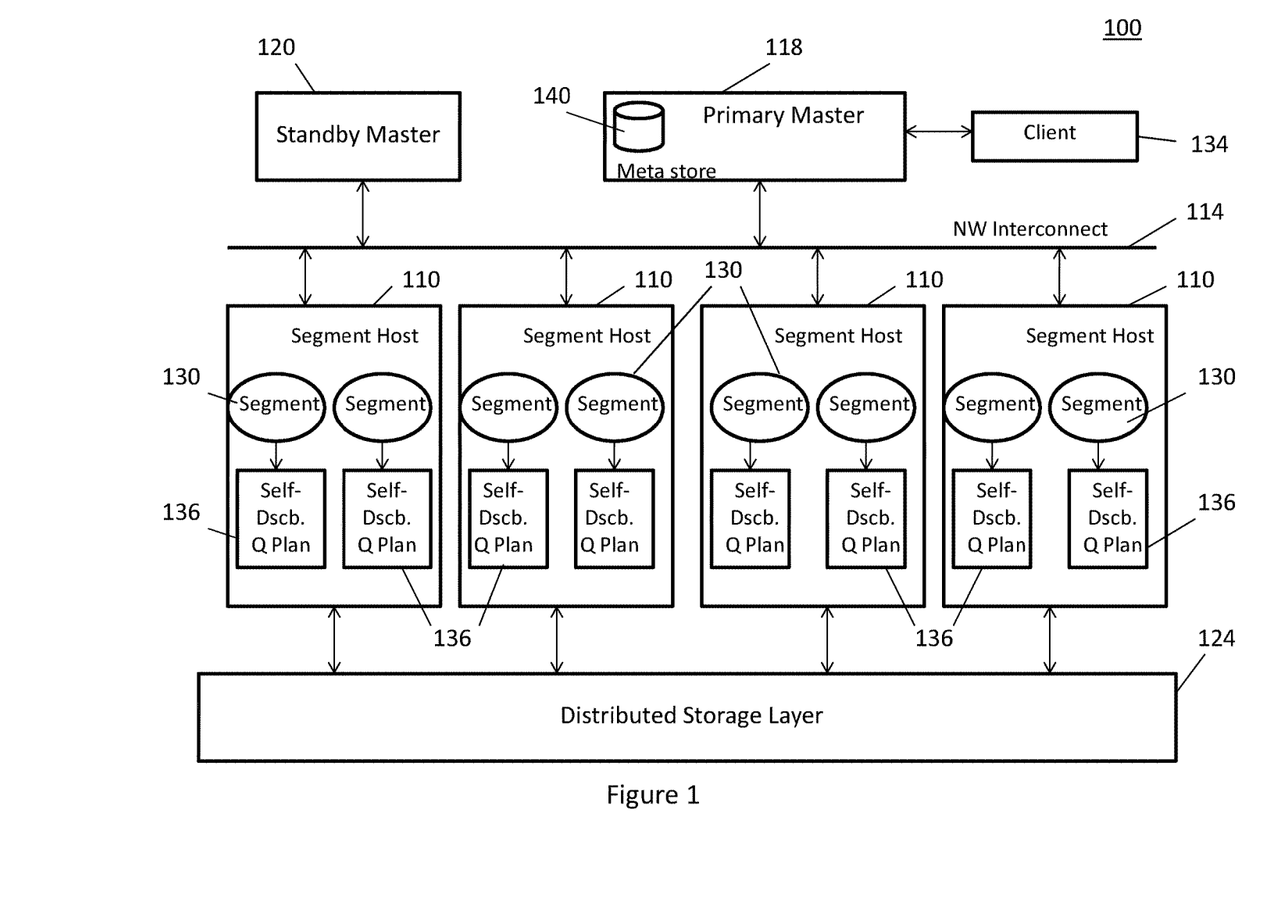
FIG. 1 is a diagrammatic view of the architecture of an MPP database system embodying the invention.

FIG. 1 is a diagrammatic view that illustrates the architecture of an MPP database system 100 in which the invention may be employed. The system 100 may comprise a large cluster of a plurality of segment hosts 110 which may be commodity servers. The servers may each comprise a central processing unit (CPU), memory, storage and input/output (I/O) which may all be conventional and are not shown in the figure. The segment hosts may be interfaced via a network interconnect 114 to a primary master host 118 and a standby master host 120, and the hosts are also interfaced to a distributed storage layer 124 that stores user data. The distributed storage layer may comprise a distributed file system, such as the Hadoop distributed file system (HDFS), running on the segment hosts, or may comprise a cluster of distributed relational database nodes. Each segment host 110 may include a plurality of segments 130 which may be computing units of a distributed database engine formed by the cluster. The segments may be programs executing on the segment hosts servers. The programs comprise executable instructions embodied in computer readable media such as physical memory or other computer program product for controlling the servers to perform operations in accordance with the invention as described herein.

The primary master 118, as will be described in more detail below, may be responsible for accepting queries from a client 134, planning queries, dispatching query plans to the segments for execution on the stored data in the distributed storage layer, and collecting the query results from the segments. The standby master 120 may be a warm backup for the primary master that takes over if the primary master fails. The primary master and the standby master may also be servers comprising conventional CPU, storage, memory and I/O components that execute instructions embodied in memory or other physical non-transitory computer readable storage media to perform the operations in accordance with the invention described herein. In addition to interfacing the segment hosts to the primary master and standby master, the network interconnect 114 also communicates tuples between execution processes on the segments.

As will be described in more detail below, when the primary master receives a query, it parses, optimizes and plans the query using a query planner and optimizer, which in a preferred embodiment are a SQL query planner and optimizer, and dispatches a query plan to the segments for execution. In accordance with the invention, after the query planning phase and prior to dispatch, the primary master converts the query plan to a self-described query plan that may comprise multiple slices. The self-described query plan is a self-contained plan that includes all of the information and metadata needed by each segment for execution of the plan. The self-described query plan includes, for instance, the locations of the files that store the tables accessed in the plan and the catalog information for the functions, operators and other objects in the query plan. In one embodiment, the information may also include the functions needed for processing the data. This information may be stored in a central metadata store 140 in the local file system or storage of the primary master from which it may be retrieved and inserted into the query plan to form the self-described query plan.

There are a number of advantages to the invention. Since the self-described query plan is self-contained, it may contain all of the information need for its execution. This obviates the need for any access by a segment to a central metadata store in order to execute the plan, thereby avoiding large volumes of network traffic and correspondingly slower response times, and avoids the necessity of the segment hosts storing the necessary metadata locally. Moreover, metadata is typically small and conveniently stored in one central location. Therefore, metadata consistency can be easily maintained. Furthermore, since the metadata may be stored in a local file system on the primary master node the insertion of the metadata into the self-described query plan 136 is fast. Following generation the self-described query plan may be broadcast to the segments 130 for execution, as indicated in the figure. In accordance with the invention, the segments may be stateless, i.e., they act as slave workers and have no need to maintain any state information for persistent files, functions and so on. This advantageously permits the segments to be relatively simple and fast.

Several optimizations are possible. One optimization is that the self-described query plan may be compressed prior to dispatch to decrease the network costs for broadcasting the plan. For a deep sliced query on partitioned tables, the query plan size may be quite large, for example, more than 100 MB. It is preferable to decrease the size of the query plan that must be broadcast by compressing the plan. In a preferred embodiment, a local read-only cache may be maintained on each segment (as will be described) to store static read-only information that seldom if ever changes, such as type information, built-in function information, query operators, etc. This information may include the functions and operators needed to execute the self-described query plan, e.g., Boolean functions such as SUM, and various query operators so that the plan itself need only contain a reference to the functions and operators, and identifiers for their argument or object values. The read-only cache may be initialized during a system bootstrap phase. Then, when a self-described query plan is constructed at the master, changeable metadata and information maintained in the master may be incorporated into the plan. Since it is known that any static read-only information may be obtained from the local caches on the segments, it is unnecessary to place this information into the plan that is broadcast.

Figure 2:
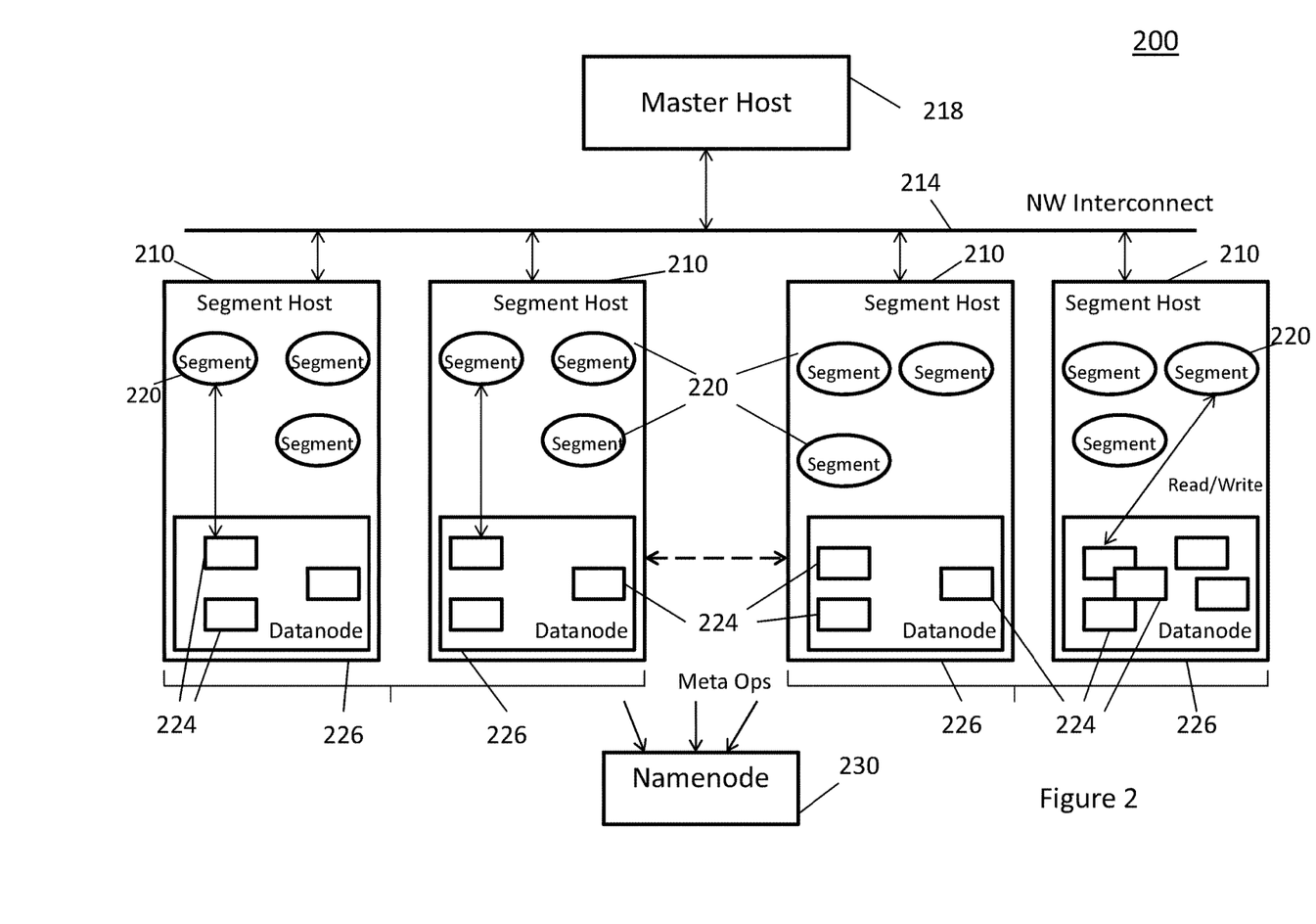
FIG. 2 illustrates in more detail the architecture of a preferred embodiment of an MPP database in accordance with the invention.

FIG. 2 illustrates in more detail the architecture of an MPP database 200 that integrates a Hadoop HDFS distributed file system and a parallel distributed relational database. Instead of writing to discs as in a traditional database, the data is written to the HDFS distributed file system. The HDFS file system may be a traditional hierarchical file organization that comprises directories and allows users and applications to store files inside of these directories. A plurality of segment hosts 210 are interfaced via a network interconnect 214 to a master host 218. The segment hosts may comprise commodity servers as described above for FIG. 1, and each segment host may comprise a plurality of segments 220. Each segment reads and writes data to a DataNode 226 where the data is stored in a plurality of data blocks 224 in its local file system. Each data block may store 64 MB of data. The DataNodes 226 are responsible for serving read and write requests from file system clients, and may also perform functions such as block creation, deletion and replication. The system may further include a NameNode 230 which serves as a master for the HDFS. The NameNode stores and maintains the HDFS namespace, and may maintain a transaction log that persistently records changes that occur to the file system metadata. It also may maintain an image of the entire file system namespace and a block map in its memory. The DataNodes 226 and the NameNode 230 may comprise software programs that run on the servers. As described in connection with FIG. 1, the master host 218 may accept queries from clients, optimize, plan and dispatch self-directed query plans to the segments for execution, and receive the results of the queries from the segments.

Figure 3:
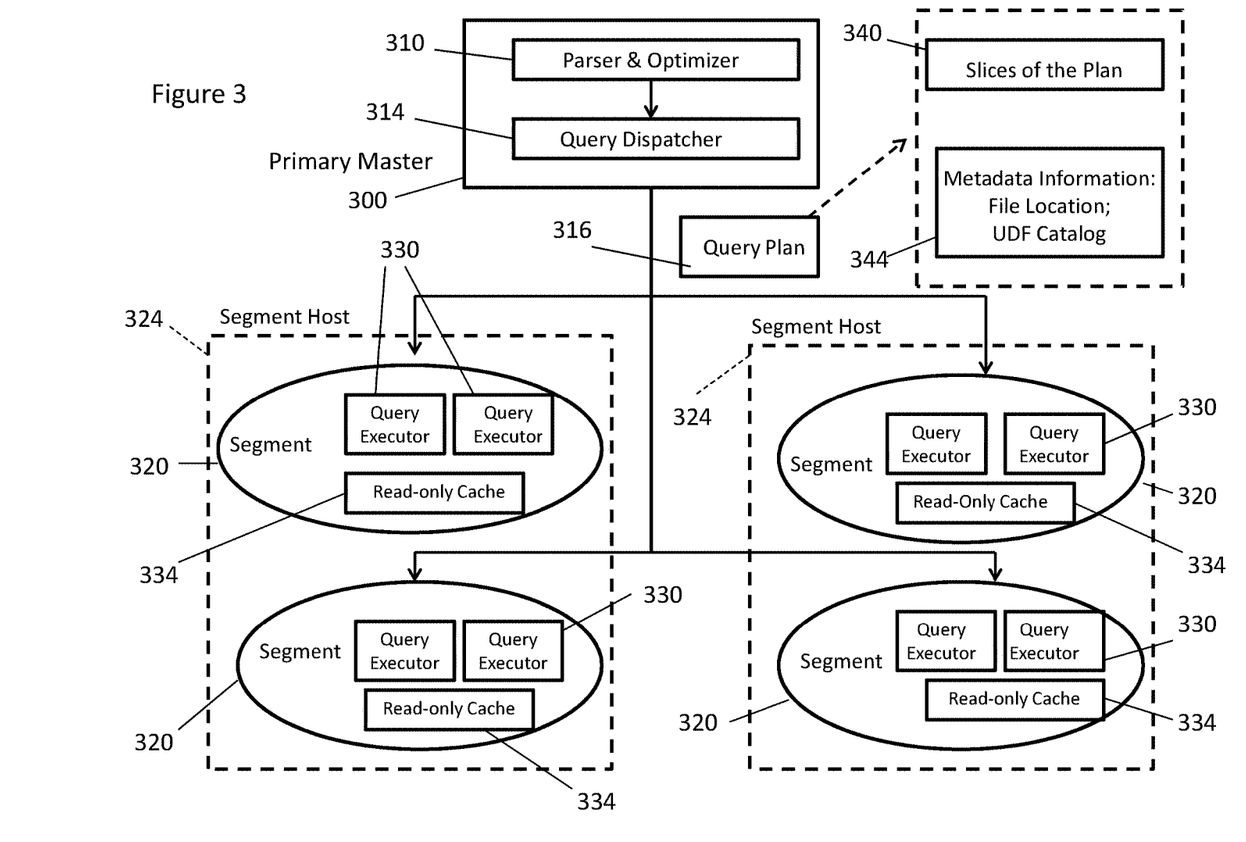
FIG. 3 is a diagrammatic view illustrating an embodiment of a primary master of the system of FIG. 1.

FIG. 3 illustrates in more detail the construction and processing of a self-described query plan in accordance with the invention. As previously described, and as shown in the figure, a primary master 300 may include a SQL query parser and optimizer 310 for parsing and optimizing an input query to produce a SQL query plan, and may include a query dispatcher 314 for broadcasting the resulting query plan 316 to a plurality of segments 320 in a large cluster of segment hosts 324. Each segment includes a plurality of query executors 330 comprising processes that run on the segments to execute the query plan that is dispatched to the segments. Preferably, each segment also includes a read-only cache 334 that stores static read-only information such as type information, built-in function information, etc., as described above. After the parser and optimizer 310 generates a query plan 316, the query plan is converted into multiple slices 340, where each slice represents a unit of work that can be performed separately. For each slice, there is a query executor 330 in each segment. Once the query plan has been produced and sliced, the number of query executors needed to execute the query plan is known. The query dispatcher 314 may then inform the segments to set up the number of query executors 330 required for execution. Next, the metadata information 344 required to execute the query plan, such as file location, catalog information, etc., may be inserted into the query plan as previously described to convert the query plan into a self-described query plan. The query dispatcher 314 may then broadcast the self-described query plan to all query executors in all segments.

When each query executor 330 receives the query plan, it can determine what command in the query plan that query executor should process. Because the query executors are set up by the query dispatcher after the self-described query plan has been generated, the query dispatcher knows the slice number and segment index information and may include this information in the query plan that is broadcast. Upon receiving the query plan, a query executor can look up the metadata information that the query executor needs to process the command. This metadata may be found either from the self-described query plan itself or from the read-only data in the read-only cache 334 in the segment. The self-described query plan may include an identifier or other indicator that designates the read-only information stored in the read-only cache that the query executor needs to execute the command. Once the query executor executes the command, it may follow the information in the command and send the results to a next-indicated query executor or return the results to the query dispatcher in the primary master. As will be appreciated, broadcasting the self-described query plan to each segment is a new execution model and process that enables full SQL functionality to be extended to distributed file systems such as HDFS.

Figure 4:
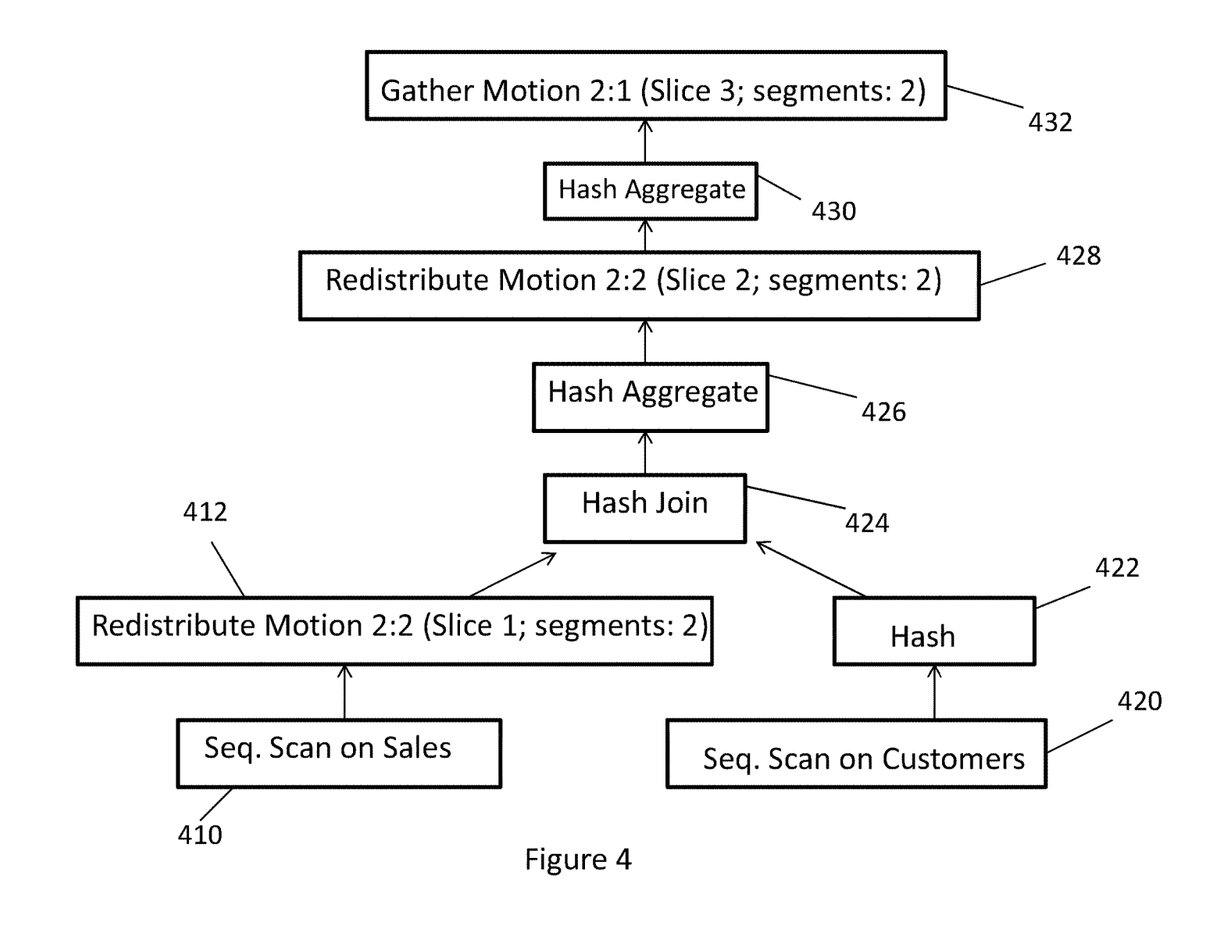
FIG. 4 is a diagrammatic view illustrating an example of a slicing operation of the invention.

FIG. 4 illustrates an example of slicing and processing a self-described query plan in accordance with the invention. In the example illustrated in the figure, the query plan is sliced into three slices, and each slice is to be executed on a query executor in two segments. The first slice (Slice 1) comprises process steps 410 and 412. The second slice (Slice 2) comprises steps 420-428. The third slice (Slice 3) comprises steps 430 and 432.

After the master generates the query plan shown in FIG. 4, the query dispatcher will communicate with the two segments in the cluster and inform the segments to establish three query executor processes.

As shown in the figure, the query plan execution begins for Slice 1 at 410 with a sequential scan on a table containing sales data by query executors on two segments. Each query executor will only perform the sequential scan command on its own table data. For example, the query executor for Slice 1 on segment 1 will only perform the sequential scan on the table sales data for segment 1. Information on the portion of the table the query executor should process is obtained from the metadata information embedded in the self-described query plan. After the query executor performs the sequential scan for Slice 1 at 410, it will perform a redistribute motion at 412 to distribute the data to the query executors on the two segments for Slice 2. Similarly, for Slice 2 the query executors will perform a sequential scan of a table of customer data at 420, hash the results at 422, perform a hash join operation at 424 with results of the redistribute motion operation at 412, execute a hash aggregate command at 426, and a perform a redistribute motion operation at 428. Finally, for Slice 3, the query executors will execute a hash aggregate command at 430 and a gather motion command at 422 to gather the results.

In each process step of FIG. 4, the query plan will either directly include the metadata or other information needed by the query executors on a segment to execute the process step, or an identifier to the required metadata or information in the read-only cache on the segment.

As will be appreciated, the invention affords a new self-described query execution model and process that has significant advantages in increasing the speed and functionality of MPP data stores by decreasing network traffic and affording better control of metadata consistency. The process of the invention allows full advantage to be taken of Hadoop HDFS and other distributed file systems for multi-structured big data by extending to such systems a massively parallel execution SQL engine and the functionality.

While the foregoing has been with respect to preferred embodiments of the invention, it will be appreciated that changes to these embodiments may be made without departing from the principles and spirit of the invention, the scope of which is defined in the appended claims.

The invention claimed is:

1. A method of query execution in a massively parallel processing (MPP) data storage system comprising a master node and a cluster of multiple distributed segments that access data in distributed storage, comprising:

producing a self-described query plan at the master node that is responsive to a query for accessing data in the distributed storage to satisfy the query, said producing comprising incorporating, into a query plan at the master node, metadata and other information needed by the segments to execute the query plan to create said self-described query plan, wherein said metadata and other information comprise information as to locations of said data in said distributed storage that are accessed by said self-described query plan, and catalog information for functions and operators used in the self-described query plan for processing the data, and wherein said metadata and other information are stored in a store at said master node, wherein in the event that a part of such metadata or a part of such other information needed by the segments to execute the query plan is stored at the cluster of multiple distributed segments, the master node includes an identifier associated with the part of such metadata or the part of such other information that is stored at the cluster of multiple distributed segments and excludes the part of such metadata or the part of such other information that is stored at the cluster of multiple distributed segments from the query plan;

broadcasting said self-described query plan to said segments for execution; and executing the self-described query plan to process said data.

2. The method of claim 1, wherein said segments comprise stateless servers, and wherein said incorporating of the metadata and other information into the query plan comprises incorporating all metadata and information needed for execution of the self-described query plan such that all the metadata and information needed for execution is contained in said self-described query plan.

3. The method of claim 1 further comprising storing said metadata and other information that is changeable in a central store at said master node, and further storing at each of said segments static information comprising function and query operator information needed by the segments for executing the self-described query plan.

4. The method of claim 1 further comprising storing static information comprising type and built-in function and operator information in a read-only cache at each segment, and accessing such static information in said read-only cache of a segment by said self-described query plan as needed for execution of said self-described query plan on such segment.

5. The method of claim 4, wherein said producing comprises incorporating in said self-described query plan a reference to said static information with which one of the distributed segments accesses said such static information from said read-only cache as needed for execution of said self-described query plan.

6. The method of claim 4, wherein the self-described query plan is executed such that the segments do not access a central metadata store in connection with executing the self-described query plan.

7. The method of claim 1, wherein said self-described query plan comprises a SQL query plan, and the method further comprises storing at each of said segments static SQL function and operator information needed by said segments to execute said SQL query plan.

8. The method of claim 1, wherein said cluster comprises distributed server nodes hosting said segments, and said distributed storage comprises a distributed file system on said server nodes, and wherein said executing comprises executing said self-described query plan in parallel on said distributed server nodes.

9. The method of claim 1, wherein said cluster comprises distributed relational database nodes.

10. The method of claim 1, wherein said master node comprises a query planner for producing said self-described query plan, and the method further comprises slicing by said master node said self-described query plan into slices, informing each of said segments to set up a query executor for said each slice on each segment.

11. The method of claim 10, wherein said incorporating comprises inserting into said self-described query plan slice and segment index information for each such segment to identify the metadata that each query executor needs to access to execute said self-described query plan.

12. The method of claim 1, wherein the executing the self-described query plan to process the data comprises executing, by said segments, the self-described query plan to process said data without accessing a central metadata store.

13. The method of claim 1, wherein the self-described query plan is executed such that the segments do not access a central metadata store in connection with executing the self-described query plan.

14. The method of claim 1, further comprising:
compressing the self-described query plan before the broadcasting of the self-described query plan.

15. The method of claim 1, wherein the query plan comprises an identifier associated with information that is stored at the cluster of multiple distributed segments.

16. Computer readable storage media for storing executable instructions for controlling the operation of one or more computers in a massively parallel processing (MPP) data storage system comprising a master node and a cluster of multiple distributed segments that access data in distributed storage to perform a method of query execution comprising:
producing a self-described query plan at the master node that is responsive to a query for accessing data in the distributed storage to satisfy the query, said producing comprising incorporation, into a query plan at the master node, metadata and other information needed by the segments to execute the query plan to create said self-described query plan, wherein said metadata and other information comprise information as to locations of said data in said distributed storage that are accessed by said self-described query plan, and catalog information for functions and operators used in the self-described query plan for processing the data, and wherein said metadata and other information are stored in a store at said master node, wherein in the event that a part of such metadata or a part of such other information needed by the segments to execute the query plan is stored at the cluster of multiple distributed segments, the master node includes an identifier associated with the part of such metadata or the part of such other information that is stored at the cluster of multiple distributed segments and excludes the part of such metadata or the part of such other information that is stored at the cluster of multiple distributed segments from the query plan;
broadcasting said self-described query plan to said segments for execution; and
executing the self-described query plan to process said data.

17. The computer readable storage media of claim 16, wherein said segments comprise stateless servers, and wherein said incorporating of the metadata and other information into the query plan comprises incorporating all metadata and information needed for execution of the self-described query plan such that all the metadata and information needed for execution is contained in said self-described query plan.

18. The computer readable storage media of claim 16 further comprising storing said metadata and other information that is changeable in a central store at said master node, and further storing at each of said segments static information comprising function and query operator information needed by the segments for executing the self-described query plan.

19. The computer readable storage media of claim 16 comprising storing static information comprising type and built-in function and query operator information in a read-only cache at each segment, and accessing such static information in said read-only cache of a segment as needed for execution of said self-described query plan on such segment.

20. The computer readable storage media of claim 16, wherein said self-described query plan comprises a SQL query plan, and the method further comprises storing at each of said segments static SQL function and operator information needed by said segments to execute said SQL query plan.

21. The computer readable storage media of claim 16, wherein said cluster comprises distributed server nodes hosting said segments, and said distributed storage comprises a distributed file system on said server nodes, and wherein said executing comprises executing said self-described query plan in parallel on said distributed server nodes.

22. The computer readable storage media of claim 16, wherein said master node comprises a query planner for producing said self-described query plan, and the method further comprises slicing by said master node said self-described query plan into slices, and informing each of said segments to set up a query executor for each slice on said each segment.

23. The computer readable storage media of claim 22, wherein said incorporating comprises inserting into said self-described query plan slice and segment index information for each such segment to identify the metadata that each query executor needs to access to execute said self-described query plan.

24. The computer readable storage media of claim 16, wherein the self-described plan is executed to process said data such that the segments execute the self-described query plan to process said data without accessing a central metadata store.

* * * * *